United States Patent
Topiwala et al.

(10) Patent No.: US 9,870,307 B2
(45) Date of Patent: Jan. 16, 2018

(54) REGRESSION TESTING OF SOFTWARE SERVICES

(71) Applicant: LinkedIn Corporation, Mountain View, CA (US)

(72) Inventors: Sajid Topiwala, San Jose, CA (US); Anant Rao, Fremont, CA (US); Pritesh Shah, Sunnyvale, CA (US); Walter Scott Johnson, San Francisco, CA (US); Arunprasad Venkatraman, Fremont, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 15 days.

(21) Appl. No.: 15/012,600

(22) Filed: Feb. 1, 2016

(65) Prior Publication Data

US 2017/0220448 A1    Aug. 3, 2017

(51) Int. Cl.
  *G06F 9/44* (2006.01)
  *G06F 11/00* (2006.01)
  *G06F 11/36* (2006.01)

(52) U.S. Cl.
  CPC ........ *G06F 11/362* (2013.01); *G06F 11/3688* (2013.01)

(58) Field of Classification Search
  CPC ... G06F 11/362; G06F 11/368; G06F 11/3688
  USPC ............ 717/124–135; 714/37, 38.1
  See application file for complete search history.

(56) References Cited

U.S. PATENT DOCUMENTS

| | | | | |
|---|---|---|---|---|
| 6,070,190 A | * | 5/2000 | Reps | G06F 11/3495 709/203 |
| 6,192,108 B1 | * | 2/2001 | Mumford | H04M 3/242 379/10.03 |
| 6,427,000 B1 | * | 7/2002 | Mumford | H04M 3/242 379/10.03 |
| 6,546,413 B1 | | 4/2003 | Northrup | |
| 9,253,255 B1 | | 2/2016 | Bosch | |
| 9,519,920 B1 | | 12/2016 | Chitilian | |
| 2004/0060057 A1 | * | 3/2004 | Hansen | H04L 12/2697 719/328 |
| 2004/0139152 A1 | | 7/2004 | Kaler | |

(Continued)

OTHER PUBLICATIONS

Khanduri, Puneet, "Diffy: Testing services without writing tests," <https://blog.twitter.com/2015/diffy-testing-services-without-writing-tests>, Sep. 3, 2015, p. 1-8.*

(Continued)

*Primary Examiner* — Qing Chen
(74) *Attorney, Agent, or Firm* — Hickman Palermo Becker Bingham LLP

(57) ABSTRACT

Techniques are provided for mocking downstream services while regression testing a service. In one technique a version of a service processes a request, during which one or more computers intercept downstream service calls made by the version of the service. For each downstream service call of the downstream calls, a computer provides, to the version of the service, a response of the downstream service call, which was previously recorded while processing the request in a production environment. Processing, by the version of the service, the request involves processing the request based on the response of at least one of the downstream service calls.

19 Claims, 9 Drawing Sheets

COMPUTER CLUSTER 100

(56) References Cited

U.S. PATENT DOCUMENTS

| | | | |
|---|---|---|---|
| 2005/0120341 A1* | 6/2005 | Blumenthal | G06F 11/3428 717/158 |
| 2006/0074807 A1 | 4/2006 | Gauba | |
| 2007/0079382 A1 | 4/2007 | Celikkan | |
| 2007/0129929 A1* | 6/2007 | Nakamura | G06F 9/4843 703/22 |
| 2007/0263541 A1* | 11/2007 | Cobb | H04L 12/2602 370/235 |
| 2008/0162552 A1* | 7/2008 | Bonev | G06F 8/75 |
| 2008/0178161 A1 | 7/2008 | Cates | |
| 2008/0178169 A1* | 7/2008 | Grossner | H04L 67/16 717/170 |
| 2009/0165107 A1 | 6/2009 | Tojo | |
| 2009/0324214 A1 | 12/2009 | Li | |
| 2011/0231477 A1 | 9/2011 | Safruti | |
| 2011/0231519 A1 | 9/2011 | Luby | |
| 2013/0346490 A1 | 12/2013 | Subramanian | |
| 2014/0250443 A1 | 9/2014 | Greiner | |
| 2014/0297405 A1* | 10/2014 | Fine | G06F 11/3419 705/14.53 |
| 2014/0344520 A1 | 11/2014 | Jenkins | |
| 2015/0007176 A1* | 1/2015 | Kotani | G06F 9/45533 718/1 |
| 2015/0095694 A1 | 4/2015 | Nishino | |
| 2015/0319794 A1 | 11/2015 | Long | |
| 2016/0019133 A1 | 1/2016 | Forg | |
| 2016/0170823 A1 | 6/2016 | Miller | |
| 2017/0277616 A1 | 9/2017 | Topiwala | |

OTHER PUBLICATIONS

Ruth et al., "A Safe Regression Test Selection Technique for Web Services," 2007, IEEE.*

Ribeiro, Camilo, Twitter Diffy, "My First Impressions" Testing Flavors, Testing and Continuous Delivery, http://testingflavors.com/2015/09/19/twitter-diffy-my-first-impressions/, dated Sep. 19, 2015, 9pgs.

Topiwala, U.S. Appl. No. 15/080,989, filed Mar. 25, 2016, Office Action, dated Jun. 19, 2017.

Topiwala, U.S. Appl. No. 15/080,989, filed Mar. 25, 2016, Notice of Allowance dated Oct. 10, 2017.

* cited by examiner

REGRESSION TESTING OF SOFTWARE SERVICES

FIELD OF THE DISCLOSURE

The present disclosure relates to regression testing of software services. Techniques for recording production call trees and replaying them in a laboratory are presented.

BACKGROUND

Discovering some regression bugs that degrade the performance or behavior of software is difficult without a production workload. A production environment may be available when a service progresses through the release cycle all the way to a canary release or until the service is fully deployed in production. A revision of source code that is committed to version control may cause a regression in performance that is only evident under high load or reveal that a latent bug that remained hidden for a long time is now triggered. Generally, these kinds of defects are difficult to isolate. For example, it can take longer to isolate a bug in source code than it takes to fix the bug. When a latent bug later emerges, some context regarding the offending commit may be lost, which can increase the time needed to fix the bug. A performance regression is important to quickly discover and isolate because it can decrease end user satisfaction and increase the consumption of valuable resources, such as time and electricity.

Here are some reasons why finding regressions late in release cycle is problematic:
  Isolating offending commit(s) is hard;
  Even after the commit has been identified. The semantics of the code or the logical flow might be forgotten, and it might be difficult to fix the bug without completely understanding the intent of the entire commit;
  The code needs to roll back from Production machines;
  The release cycle is reset and throws off team timelines and deliverable schedules;
  New developers get skittish about making check-ins, perhaps because a release may be difficult to roll back. This can cause stress and impact the job satisfaction of a developer.
  Release cycles are deliberate and long, exacerbating the issues mentioned above. A way is needed to handle these issues before the service gets released.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for mocking downstream services while regression testing a service. In one technique, a version of a service processes a request, during which one or more computers intercept downstream service calls made by the version of the service. For each downstream service call, a computer provides, to the version of the service, a response of the downstream service call, which was previously recorded while processing the request in a production environment. Processing, by the version of the service, the request involves processing the request based on the response of at least one of the downstream service calls.

In an embodiment, a sampling of production traffic is automatically recorded. A call tree of service calls and responses is stored as a unit.

In an embodiment, an approved (e.g. released) version is also executed as a scientific control against which the behavior of the service under test may be compared. In an embodiment, two copies of the approved version are executed to detect unstable (non-repeatable) requests and fields of requests and responses.

Example Computer System

Figure 1:
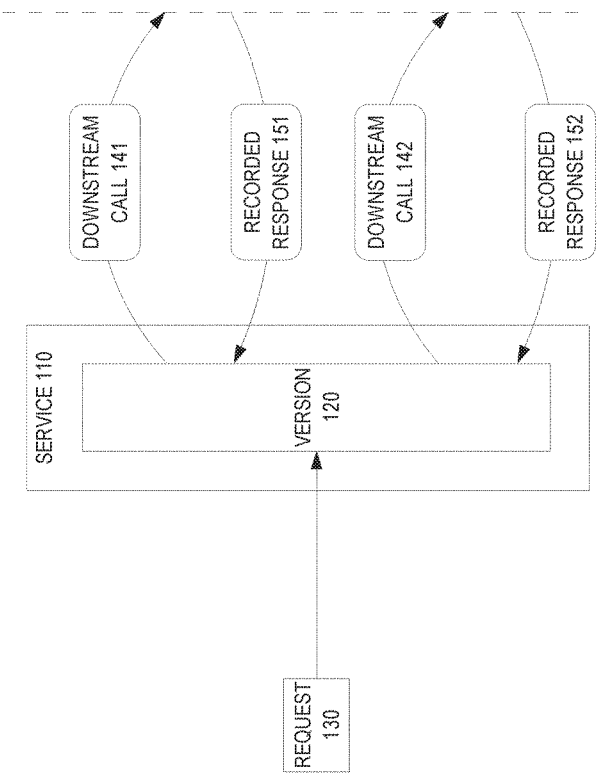
FIG. 1 is a block diagram that depicts an example computer cluster that performs regression testing of a software service, in an embodiment.

FIG. 1 is a block diagram that depicts example computer cluster 100 that performs regression testing, in an embodiment. Computer cluster 100 may replay recorded responses to a service under test to detect a regression defect.

Computer cluster 100 may be any computer or networked aggregation of computers. A computer of computer cluster 100 may be a personal computer, a rack server such as a blade, a virtual machine, a smartphone, or other general purpose computer.

Computer cluster 100 includes service 110. Service 110 may be any software component that exposes a service interface and that can be instantiated within a software container.

Service 110 may be a bean, a component, a module, a script, or other software unit that can be decoupled from its dependencies such as downstream services that service 110 may invoke. Service 110 may be a web service that accepts a request and then processes the request to generate a response.

In an embodiment, service 110 is invoked remotely or from another operating system process. In an embodiment, service 110 invokes downstream services that are remote or within another operating system process.

In an embodiment, service 110 uses a low-level protocol for transport such as hypertext transfer protocol (HTTP) or Java remote method protocol (JRMP) to transfer a request or a response. In an embodiment, service 110 uses a high-level protocol to coordinate with other programs that are remote or within another operating system process.

In an embodiment, the high-level protocol is synchronous, such as a remote procedure call (RPC) protocol, such as representational state transfer (REST), simple object access protocol (SOAP), or Java remote method invocation (RMI). In an embodiment, the high-level protocol is asynchronous, such as protocol buffers or Java message service (JMS). In an embodiment, requests and responses bear data that is encoded according to a marshalling format such as extensible markup language (XML), JavaScript object notation (JSON), or Java object serialization.

Service 110 may be repeatedly built, with each build constituting a particular version of service 110. In this example, version 120 of service 110 is of unproven quality and deployed in some monitored environment, such as a developer laptop, a test laboratory, or a production data center.

In operation, computer cluster 100 exercises version 120 to detect regression defects. A regression defect may impact the behavior of version 120 in a way that causes any observable deviation from expected behavior. Expected behavior may be established theoretically or by observing an earlier version of service 110 that is approved as a behavioral baseline.

In operation, version 120 receives request 130. Request 130 may be contrived to approximate a realistic request. Alternatively, request 130 may be earlier recorded from within ordinary traffic, such as live production traffic, in which case request 130 is subsequently replayed to version 120.

Version 120 reacts to request 130 by performing various processing operations that may include examining request 130, examining the configuration of service 110, examining the environment of computer cluster 100, invoking downstream services, and/or executing logic. Although not shown, version 120 may eventually emit a response to request 130.

In this example, version 120 makes at least downstream calls 141-142 to downstream services such as helper services, central services, and infrastructural services, which may reside upon an enterprise service bus (ESB) or within a service oriented architecture (SOA) or other ecosystem of distributed services.

However, computer cluster 100 intercepts downstream calls 141-142 without delivering them to intended downstream services. Interception is shown as the dashed vertical line in FIG. 1.

Indeed, there may or may not be downstream service implementations that version 120 can actually reach from its current environment. Interception may occur by network proxy, by instrumentation of version 120, or by executing version 120 within a software container.

In one example, request 130 may trigger a unit test of version 120 that resides on a developer laptop that has no network connectivity and hosts no downstream services. In another example, version 120 resides in a test laboratory that may lack some downstream services that might only be available in production. In another example, version 120 resides in a live production environment but is denied access to downstream services for reliability reasons such as performance, integrity, or privacy.

In any case, computer cluster 100 mocks (simulates) the availability of downstream services by delivering recorded responses 151-152 to version 120 in satisfaction of downstream calls 141-142. For example, computer cluster 100 may use downstream calls 141-142 as lookup keys for retrieving recorded responses 151-152 from a data store of recorded responses.

Recorded responses 151-152 may include header fields. For example, if recorded responses 151-152 are REST or SOAP responses, then their recording may also include an HTTP envelope with HTTP header fields.

Version 120 may process recorded responses 151-152. As such, version 120 may perform service 110 without requiring actual availability of downstream services.

This enables various degrees of isolation to be imposed upon version 120 as appropriate to various phases of a software development lifecycle (SDLC) for version 120. For example, version 120 may be a service under test (SUT) in one of various software quality assurance (SQA) phases such as unit testing or integration testing.

In one example, version 120 is built from source code that has not been committed to version control. For example, a version control check-in trigger or a build script may deliver request 130 to version 120 to perform a unit test.

In another example, version 120 was committed to a version branch that is unready for release. For example, a branch merge trigger or script may deliver request 130 to version 120 to perform an integration test.

Regression defect detection may occur in various ways. Computer cluster 100 may time the execution of version 120 and compare that time to an expected time, perhaps observed for an earlier version in, for example, production.

Computer cluster 100 may compare the contents of downstream calls 141-142 and recorded responses 151-152 to approved exemplar calls and responses, perhaps earlier recorded in production.

Version 120 may generate an upstream response to request 130. That upstream response may be compared to an approved exemplar upstream response, such as a "golden" version that is known to be correct.

Compute cluster 100 may generate a report based on those comparisons. Also based on those comparisons, computer cluster 100 may detect various control conditions such as the success or failure of version 120 or a request 130 that causes fundamentally non-repeatable processing that is unsuited for regression testing, in which case computer cluster 100 may skip request 130 and instead use another request that also awaits regression testing.

For example, computer cluster 100 may detect that the latency of service 110 has increased with version 120. Computer cluster 100 may detect that version 120 emits a downstream call that includes erroneous contents, fails to emit an expected downstream call, emits an unexpected downstream call, times out such as with a deadlock or an infinite loop, or crashes outright such as when a software exception is raised within version 120 or an abnormal signal is raised by the operating system such as a segmentation fault. These techniques are applicable, regardless of how many downstream calls version 120 emits, and how much logic version 120 executes, while processing request 130.

Example Mocking Process

Figure 2:
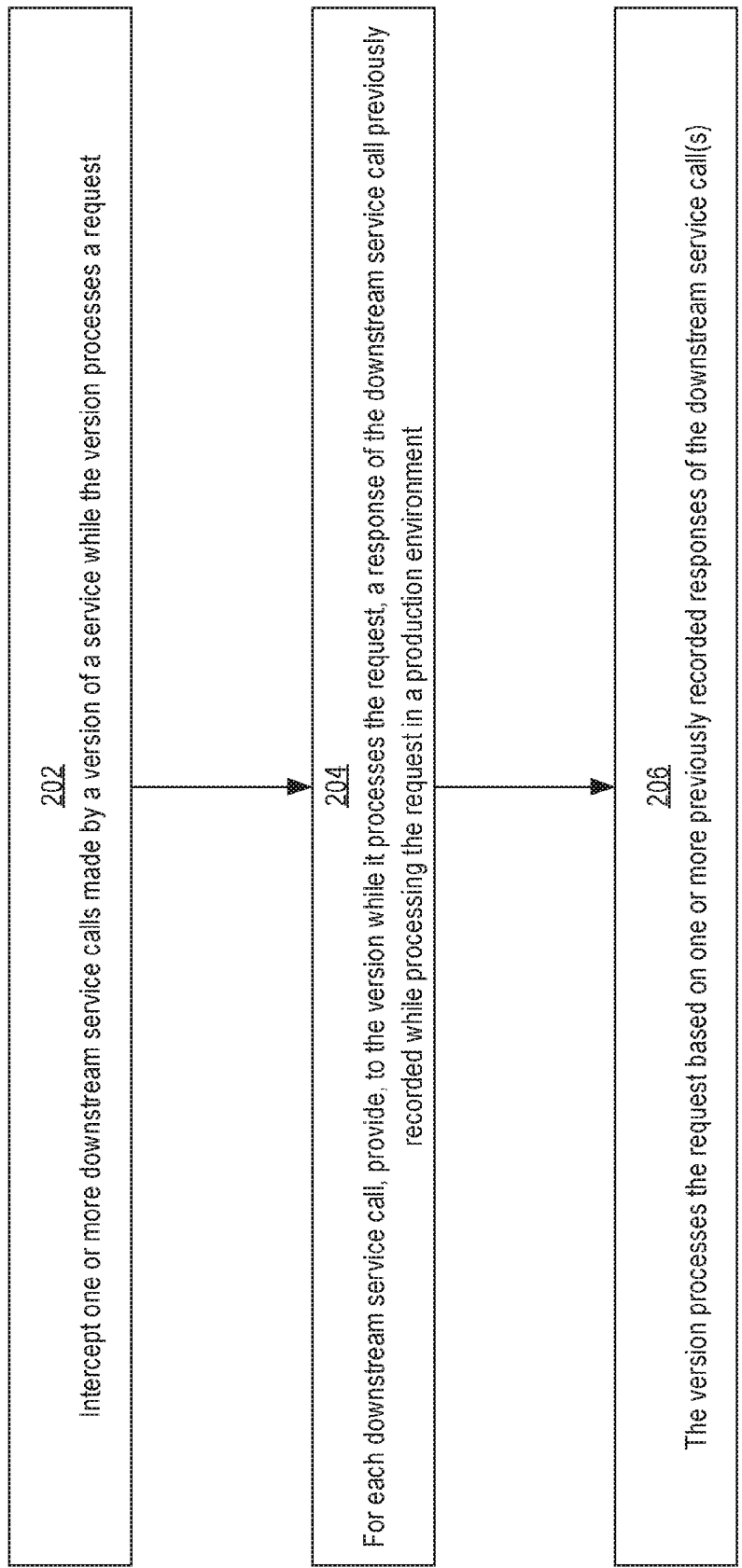
FIG. 2 is a flow diagram that depicts an example process for regression testing of a software service, in an embodiment.

FIG. 2 is a flowchart that depicts an example process 200 for replaying recorded responses to a service under test to detect a regression defect. Example process 200 is discussed with reference to computer cluster 100.

In step 202, a version of a service processes a request by making one or more downstream service calls. Each downstream service call is intercepted.

For example, a test harness may replay request 130 to version 120. Version 120 may process request 130 by making downstream calls 141-142, either sequentially or concurrently. Computer cluster 100 uses any of the interception mechanisms discussed above to intercept downstream calls 141-142.

In step 204, downstream responses are provided to the version for each downstream call made by the version. For example, computer cluster 100 may use all or part of an intercepted downstream call as a key with which to lookup an exemplar downstream response or as a parameter with which to generate such a downstream response.

In either case, computer cluster 100 provides recorded responses 151-152 to version 120 without actually invoking intended downstream services. Version 120 may or may not be aware that downstream calls 141-142 are intercepted and that recorded responses 151-152 are not live. As such, downstream services are mocked (simulated) in a way that may or may not be transparent to version 120. In an embodiment, computer cluster 100 waits for a contrived delay before providing recorded responses 151-152 to version 120. For example, the behavior of version 120 may be prone to a race condition or other temporal sensitivity that may interfere with a regression test. In some cases, an aberration caused by a race condition may be desirable to cause during regression testing, as a means of stress testing and hardening. However, for those cases where precise duplication of production conditions are desired, computer cluster may time the delivery of a recorded response to have the same latency during a regression test as was recorded in production.

In step 206, the version finishes processing the request based on the provided downstream responses. In some cases, version 120 selects which subsequent downstream calls to make and what parameters to include in those downstream calls based on responses received to earlier downstream calls while processing request 130. For example, version 120 may process recorded response 151 to decide whether to make downstream call 142 and what parameters to include within downstream call 142. Version 120 may emit an upstream response based on at least one of recorded responses 151-152. For example, if recorded response 152 indicates an error, then version 120 may emit an upstream response that indicates an error. However, an error need not indicate a failed test. For example, request 130 may be expected to result in an error.

After step 206, computer cluster 100 may take any observations that it made while request 110 is processed and compare them to expectations. As discussed above, computer cluster 100 may decide whether the regression test is a success or failure and then report the test results.

Although the semantic behavior of version 120 may be stable (repeatable), the latency of service 110 may be so variable that an anecdotal latency measurement may be unreliable. For example, software execution time may depend on instantaneous resource utilization, such as the computational load, network weather, memory swapping, or disk activity of computer cluster 100. Thus, computer cluster 100 may repeat process 200 with a same request 130 and measure the duration of each repetition. Computer cluster 100 may average these durations (or determine a median or other percentile) to obtain a statistically reliable measurement of the latency of version 120. In an embodiment, computer cluster 100 considers the variance or volatility of latencies for deciding whether a regression test failed or succeeded.

In an embodiment, computer cluster 100 calculates a sophisticated statistic from repeated measurements. For example, computer cluster 100 may calculate an arithmetic or geometric mean, a cumulative frequency distribution, a clustering, an unequal variances t-test, or an f-test. A geometric mean may help prevent a few excessively slow or resource intensive test runs from distorting the average of many consistently well-performing runs. Alternatively, a cumulative frequency analysis may provide a better understanding of the impact and likelihood of infrequent aberrations, such as a rarely occurring bug or a bug that occurs frequently but rarely has a significant effect on the average of many consistently well-performing runs. Cluster analysis may help discover patterns in particular subsets of passing or failing results. A t-test may help make a bright-line final decision as to whether a regression test failed or succeeded. An f-test may help estimate a confidence or accuracy of another test, such as a t-test.

Example Recording System

Figure 3:
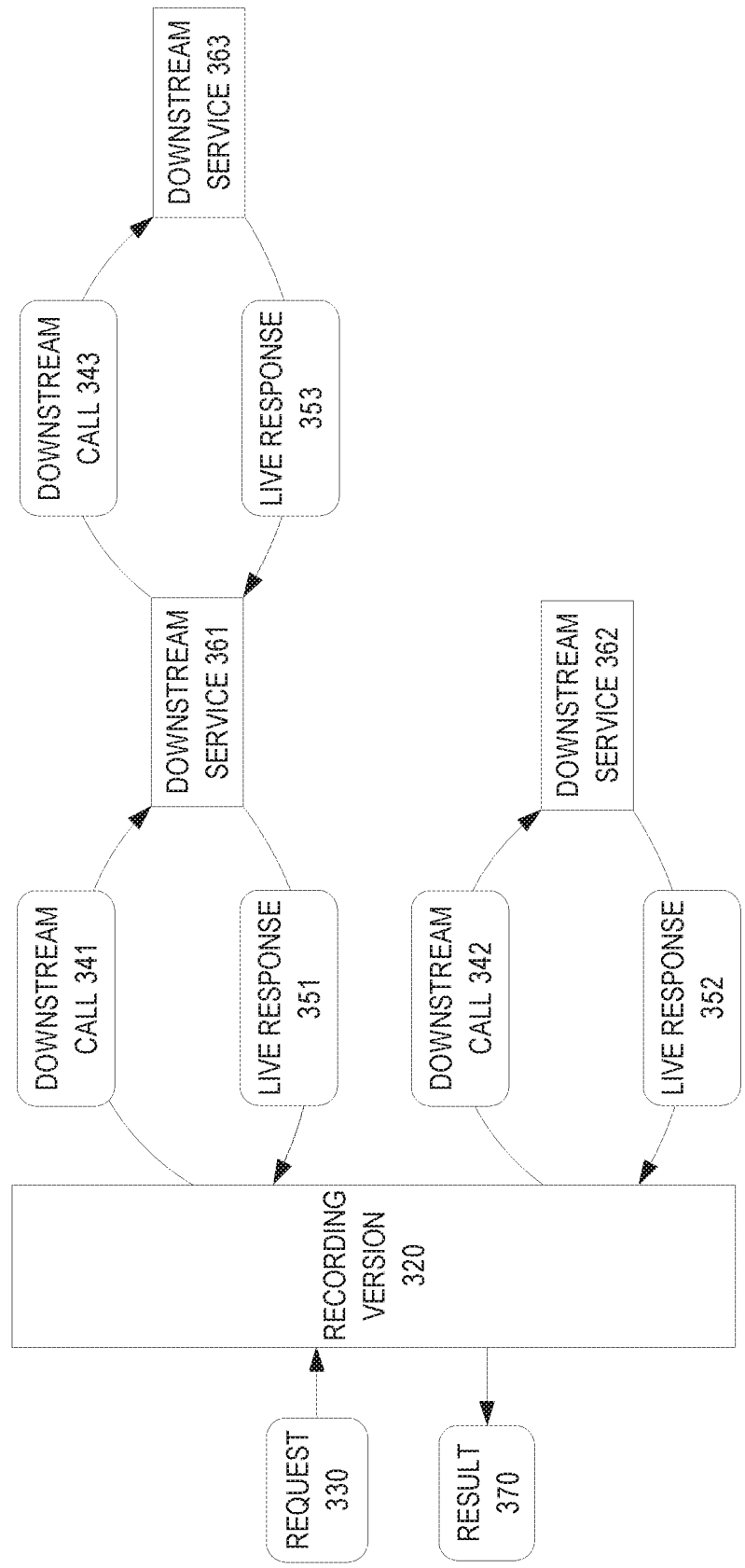
FIG. 3 is a block diagram that depicts an example production cluster that records call trees, in an embodiment.

FIG. 3 is a block diagram that depicts an example production cluster 300 that records live traffic, in an embodiment. Production cluster 300 may record service calls and responses for use as exemplars during later testing.

Production cluster may be an implementation of computer cluster 100. However, in an embodiment, production cluster 300 is used for recording exemplars, and computer cluster 100 is a separate environment that is used for replaying the exemplars during regression testing.

As such, clusters 100 and 300 may be separate complimentary environments or implemented as a single environment that serves both purposes. In one example, a single production environment may be desirable for recording and playback when the configuration or performance characteristics of live production are essential. In another example, the recorded exemplars contain confidential data, such as personally identifiable information (PII), which should only be replayed within the same secure environment in which it was recorded. In another example, separate environments are acceptable so long as PII is obscured or otherwise removed from the exemplars. In any case, recording version 320 of a service (e.g., service 110) is deployed within production cluster 300. Recording version 320 is not experimental and not the subject of any regression test. Instead, recording version 320 is similar or identical to another version that is also hosted by production cluster 300 and is the primary live version. A difference between the recording version 320 and the primary live version is that recording version 320 has recording enabled. In an embodiment, release version 320 is built with a parameter that enables recording. In another embodiment, release version 320 has a runtime variable that enables recording, such as a command line argument. Some or all of live requests for the service may be routed to version 320. A load balancer or other routing mechanism may direct most inbound requests to the release version and divert some of the inbound requests to version 320, such as request 330.

In an embodiment, the ratio of requests routed to one of the two versions is dynamically configurable. For example, production cluster 300 may be adjusted to deliver only 0.1% of requests for the service to version 320 for processing.

Both versions may or may not share downstream service implementations. Perhaps by running both versions in separate software containers that are configured differently, production cluster 300 may cause downstream calls emitted by version 320, and responses for them, to be recorded. Whereas, production cluster 300 does not record traffic involving the released version, perhaps to preserve throughput or reliability. While processing request 330, version 320 directly makes downstream calls, such as 341-342, which get recorded. Any of these downstream calls may be processed by a downstream service that further makes additional downstream calls.

For example, downstream service 361 makes downstream call 343 to invoke downstream service 363. From this pattern of cascaded calls may emerge a call tree of arbitrary depth and fan-out.

In an embodiment, only requests and responses that directly involve recording version 320 are recorded, such as 330, 341-342, 351-352, and 370. As such, the full depth of a call tree may or may not be recorded. For example, recording resources may be dedicated to gathering traffic for some services and not others, perhaps to focus attention on those services whose implementations will be revised.

Figure 4:
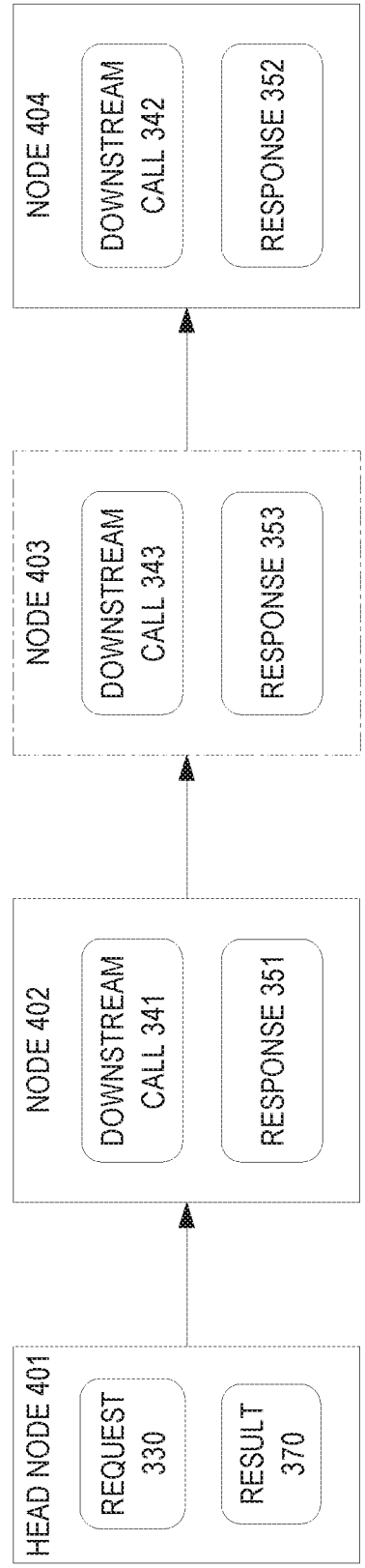
FIG. 4 is a block diagram that depicts an example linked list that stores a call tree, in an embodiment.

Production cluster 300 records all of the calls and responses that are included within a call tree, including upstream request 330 and upstream result 370. A recorded call tree may take a particular form. FIG. 4 shows an example data structure that encapsulates the call tree shown in FIG. 3.

Example Call Tree Recording

FIG. 4 is a block diagram that depicts example linked list 400 that stores a recorded call tree, in an embodiment. Linked list 400 is created by production cluster 300 and is discussed in relation to production cluster 300.

During execution of a call tree that is being recorded, the extent of the call tree may be unknown until the call tree has been fully executed, including emission of result 370. As such, linked list 400 is well suited for dynamically gathering the nodes (calls and responses) of the call tree, because a linked list can be constructed in linear time and without the slow and non-deterministic resizings of a compact (contiguous) data structure, such as an array-based structure, such as an ArrayList in Java.

Initially, production cluster 300 constructs linked list 400 with only one node, which is head node 401 that stores request 330. As version 320 processes request 330, downstream calls are made directly (such as 341) or indirectly (such as 343).When each downstream call occurs, a new node is appended to linked list 400 to record that downstream call. A synchronous call blocks the execution of the caller (calling service) until the called service replies (emits a response).

Blocking may be achieved by various low level mechanisms such as spin polling, select waiting, signals or interrupts, callbacks, or events. If all downstream calls are synchronous, then calls of an entire call tree can occur in only one ordering, which is as shown in FIG. 4.

An asynchronous call does not involve blocking. Asynchrony may use a mechanism such as a callback, an event, a future, or a thread. With asynchrony, both caller service and called service may concurrently proceed. This may introduce non-determinism, race conditions, and alternative serializations (reorderings) of downstream calls. For example if downstream call 341 is asynchronous, then the relative ordering of downstream calls 342-343 is undetermined. With asynchrony, the ordering of nodes within linked list 400 may vary, although head node 401 may be first. Asynchrony may complicate recording because multiple calls may be outstanding (responses still pending). When a response arrives, it may be difficult to determine to which outstanding call the response belongs. This determination involves correlating a response with its causal call.

Each time a live response occurs, such as 351-353, production cluster 300 correlates the response with the downstream call that caused the response. This correlation may be performed by matching some header fields of the request and the response. For example, each downstream call may be assigned a call identifier that is based on the downstream service that is invoked by the call. If a downstream service has a service interface with multiple entry points, then the call identifier may also be based on which entry point is invoked by the call.

A downstream call may bear its call identifier as a header field. The call identifier may be copied into a header field of the response. Subsequent correlation between call and response may be based on matching the call identifier.

By performing this matching correlation, production cluster 300 may look up, within linked list 400, a node that contains the downstream call that corresponds to a given response. For example, response 351 belongs in node 402 because node 402 contains downstream call 341. This look up may be accelerated by using a hash table instead of linked list 400.

When a node is appended to linked list 400, the node contains only a downstream call. When the corresponding response occurs, the response is stored in the same node as the downstream call.

Node 403 is shown with a dashed border to indicate that node 403 is present only in an embodiment that records the full depth of a call tree. For example, if an embodiment records only traffic that directly involve recording version 320, then traffic that occurs elsewhere in the call tree, such as 343 and 353, are not recorded. In that case, node 403 would not be created.

Eventually, version 320 emits result 370, which gets stored in head node 401. Finally, linked list 400 is complete (fully populated). In an embodiment, production cluster 300 records only a subset of calls that are downstream of recording version 320. For example, production cluster 300 may record only downstream calls and responses that directly involve recording version 320. For example, production cluster 300 may record downstream calls 341-342, but not 343. Likewise, live responses 351-352 may be recorded, but not live response 353.

Linked list 400 is an object graph (closed set of interconnected objects) that may then be streamed as a content unit, such as a message. For example, linked list 400 may be published to a high performance feed, such as a Kafka topic.

An advantage of a brokered feed, such as Kafka, is that stream content can be durably spooled and eventually purged based on age, perhaps as a circular buffer. This may ensure that ample and recent traffic is always available for replay.

Alternatives to Kafka include Spark and Apollo. Java Message Service (JMS) may be adequate for low volume traffic. If warehousing is needed, then an elastic database such as Cassandra may subscribe to the Kafka topic.

Multiple Call Trees

Figure 5:
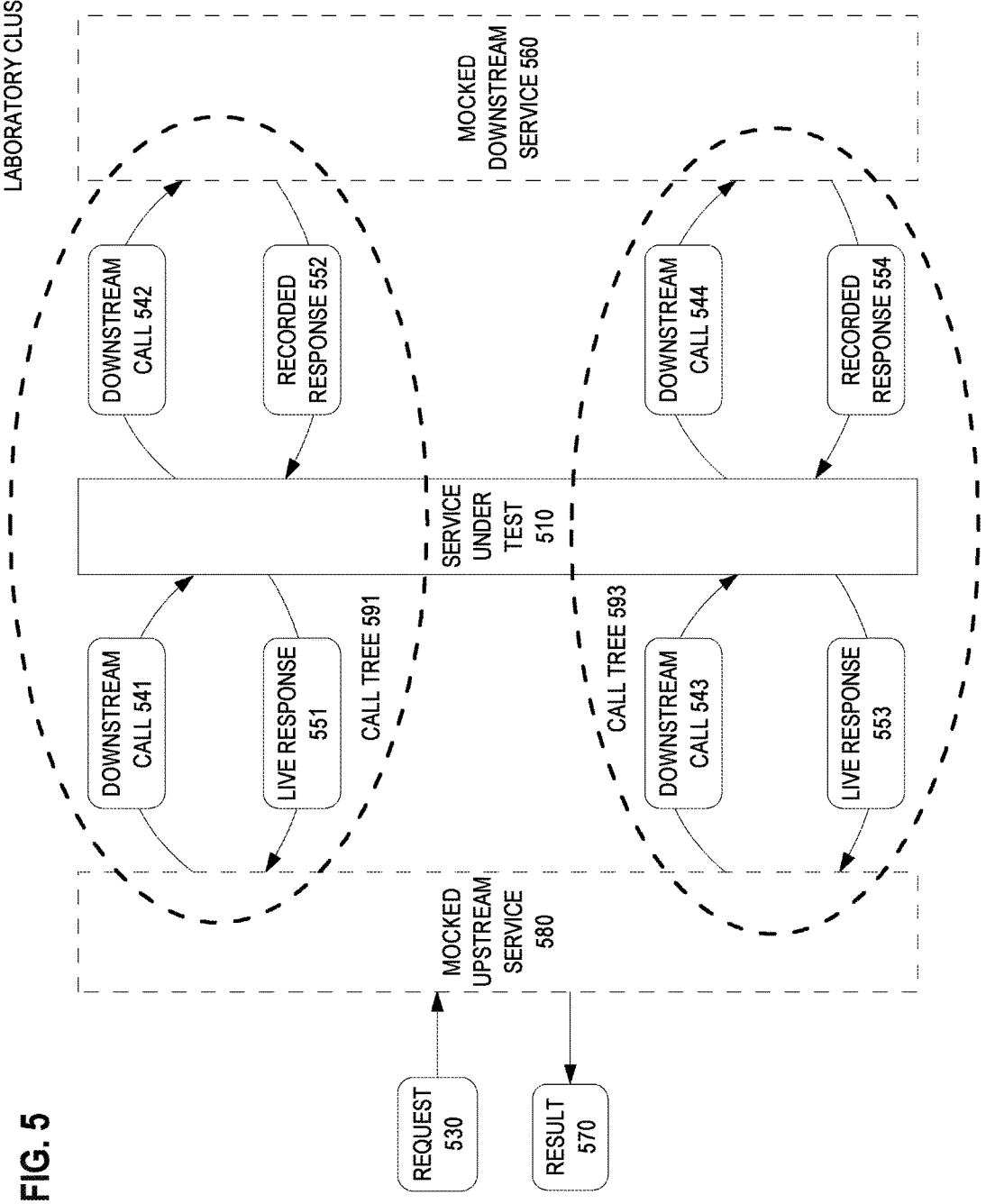
FIG. 5 is a block diagram that depicts an example laboratory system that performs regression testing of a software service, in an embodiment.

FIG. 5 is a block diagram that depicts example laboratory cluster 500 that performs regression testing, perhaps in an integration test laboratory, in an embodiment. Laboratory cluster 500 may have a service under test that is repeatedly invoked during a single processing of a single request. Although FIG. 5 illustrates only playback, the following detailed description of FIG. 5 includes discussion of both playback and recording techniques.

Laboratory cluster 500 may be an implementation of computer cluster 100. Laboratory cluster 500 includes services 510, 560, and 580.

In this example, service under test 510 mediates between upstream service 580 and downstream service 560. Because service under test 510 is being unit tested in isolation, services 560 and 580 are mocked and shown with dashed borders.

A mocked service is one that does not exist within the available environment. All calls to mocked services are intercepted and answered by replaying a recorded response.

During a regression test, request 530 is not replayed and so not sent to upstream service 580, which does not exist in this environment. However, upstream service 580 existed in a production environment during live recording.

In production, request 530 was live and sent to upstream service 580. During processing of request 530, upstream service 580 made two downstream calls, 541 and 543, to service 510.

As such, service 510 was invoked twice. With the recording scheme discussed for FIGS. 3-4, repeated invocation of a service may cause recording to malfunction because, within linked list 400, one response is correlated to one call based on the identity of the called service.

For example in FIG. 5, responses 551 and 553 are emitted by a same service (510) and so cannot be readily distinguished from each other based solely on the identity of service 510, which can confuse the recording of responses 551 and 553. The recording infrastructure accommodates repeated calls to a same service by enhancing the identifier of each downstream call.

Instead of basing a call identifier solely on a called service, the call identifier is a compound identifier that is composed of a call tree identifier in addition to the called service identifier. For example, downstream calls 541 and 543 may each be the root of a separate call tree. As such, the processing of a single request 530 causes two call trees, 591 and 593, shown as dashed ellipses.

Creation of multiple call trees from a single request may require that the production recording infrastructure be informed as to which service makes the root downstream calls of the two call trees. For example, the recording infrastructure may receive a parameter that indicates that service 510 is the focus of the recording and is intended to become a service under test during subsequent regression testing.

As such, the recording infrastructure may treat each call (541 and 543) that invokes service 510 as a root of a separate call tree. Each call tree may be assigned a distinct call tree identifier.

Each downstream call may include (perhaps as a header field) the identifier of the call tree in which the downstream call was made and/or the identifier of request 530. For example, downstream calls 541-542 and responses 551-552 may all bear the identifier of call tree 591.

Given that a call identifier may be a composite of a service identifier and a call tree identifier, during recording, response 552 can be readily correlated to downstream call 542. Likewise response 554 can be correlated to downstream call 544.

In this way, repeated invocations to a same downstream service can be properly recorded as separate calls along with their separate responses. A data structure to accommodate such separation is shown in FIG. 6.

Hash Table of Call Trees

Figure 6:
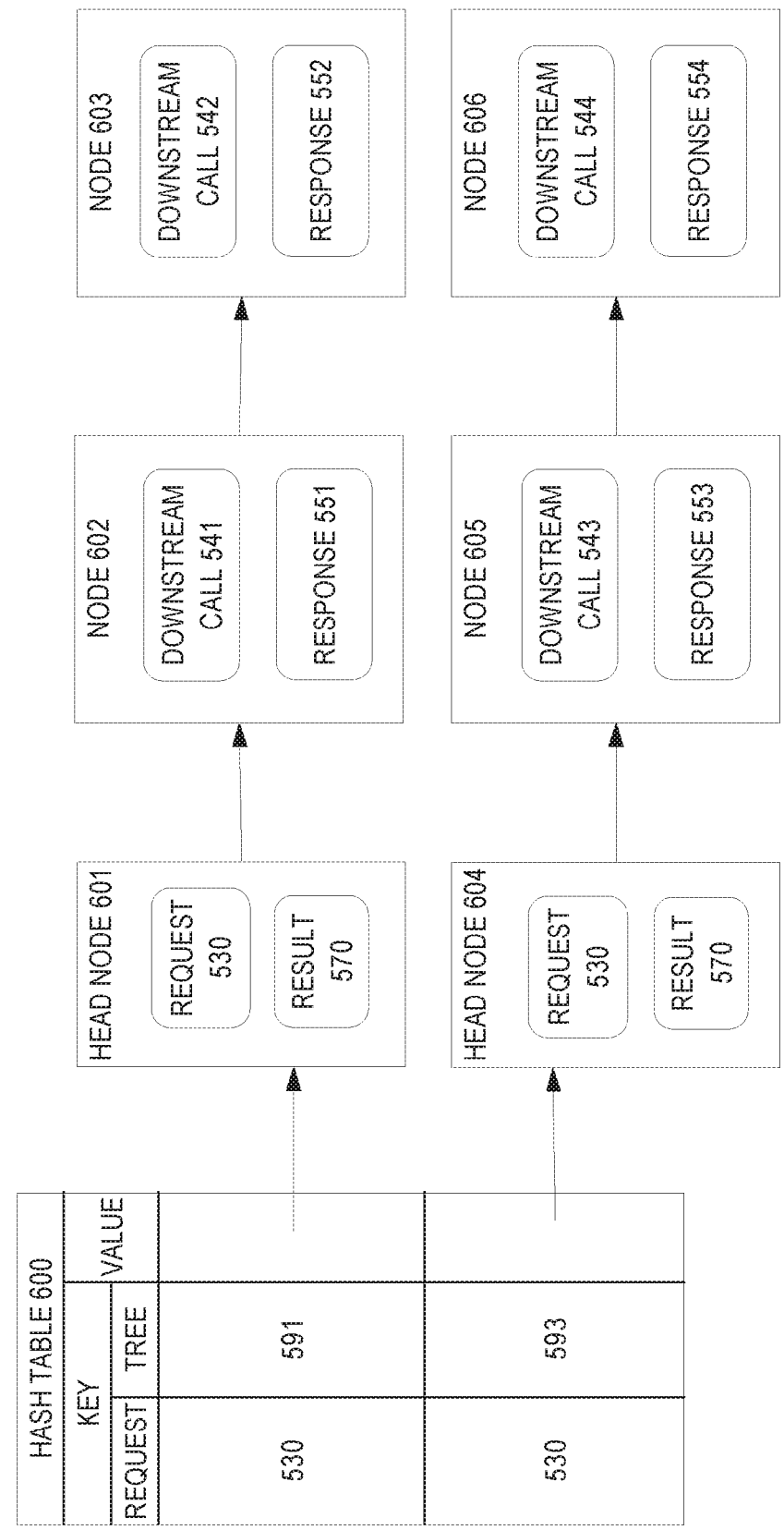
FIG. 6 is a block diagram that depicts an example hash table that stores multiple call trees, in an embodiment.

FIG. 6 is a block diagram that depicts example hash table 600 that stores multiple recorded call trees, in an embodiment. Although hash table 600 is created by production recording infrastructure, hash table 600 is later consumed by laboratory cluster 500 of FIG. 5. As such, hash table 600 is discussed in relation to laboratory cluster 500.

Hash table 600 contains pairings of a key with a value. Each key may be a composite of an identifier of a request, such as 530, and an identifier of a call tree, such as 591 or 593.

Each value of hash table 600 may be a reference to a linked list that encapsulates the call tree that is identified by the tree identifier of the key. Construction (recording) of each list occurs more or less as described for linked list 400 of FIG. 4.

During recording, the identifiers of the original request (e.g. 530) and the current call tree are included as header fields of the current call or response. These header fields are propagated downstream and copied into any call or response that occurs downstream. For example, downstream call 542 may bear the identifiers of request 530 and call tree 591 as header fields. The production recording infrastructure can read those header fields to construct a compound key for use with hash table 600. In this way, when recorded response 552 needs correlation with downstream call 542, the compound key may be used to look up downstream call 542 from within hash table 600. In some implementations, a compound key may be unnecessary. For example, if a tree identifier is globally unique across all requests, then the tree identifier by itself is sufficient as a key. However, it is generally important to be able to associate multiple call trees with one request. For that reason, a compound key may be composed of a tree identifier and a request identifier.

Hash table 600 may have additional key-value pairs. For example, hash table 600 may also store a call tree of another request (not 530 and not in a same transaction as 530) for the same upstream service 580. Likewise, hash table 600 may also store a call tree for an unrelated request that invokes a different upstream service than 580.

Golden Version

Figure 7:
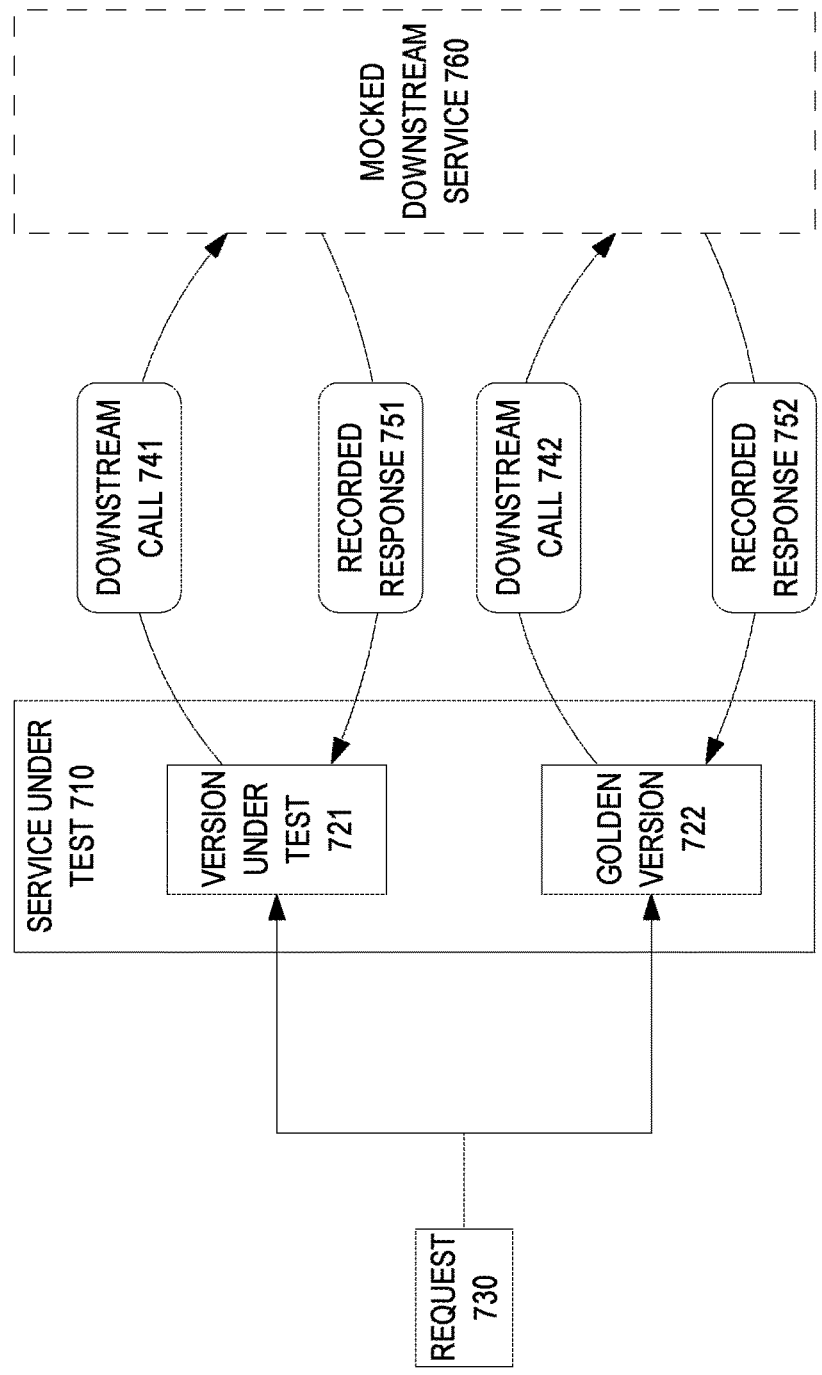
FIG. 7 is a block diagram that depicts an example laboratory cluster that performs regression testing of a software service, in an embodiment.

FIG. 7 is a block diagram that depicts example laboratory cluster 700 that executes two versions of a same service, in an embodiment. Laboratory cluster 700 may twice replay a request by sending the same request to both versions and then verify that their results match.

Laboratory cluster 700 may perform a regression test that is a unit or integration test, perhaps in a test or development environment. Laboratory cluster 700 may be an implementation of computer cluster 100.

Laboratory cluster 700 includes service under test 710. Service under test 710 is redundantly implemented by versions 721-722, which may be deployed within a same software container, separate containers on a same computer, or containers on separate computers.

Request 730 may be serially or concurrently replayed to both of versions 721-722. When invoked, both versions call downstream service 760, which is mocked (not actually available).

After both of versions 721-722 finish processing request 730, laboratory cluster 700 compares their results. If the results are different in any way or are sufficiently dissimilar, then this regression test fails because a regression anomaly (defect) is detected.

Version under test 721 may be an experimental build, such as a release candidate or a candidate pending commission to version control. As such, the performance and semantic behavior of version under test 721 is suspect. Golden version 722, on the other hand, is an approved (e.g. released) version that may operate as an exemplar because golden version 722 is known to behave more or less correctly and perform more or less within an expected resource budget. For example, golden version 722 may be a copy of whichever build is live in production. For example, golden version 722 may be fast, lean, and without bugs. Golden version 722 helps fulfill an important purpose of filtering noise that is introduced by laboratory cluster 700 or is an inherent consequence of request 730 being too stateful to be properly regression tested. For example, request 730 may cause version under test 721 to crash. Whether a crash constitutes a regression failure depends on whether request 730 also caused golden version 722 to crash. If both versions 721-722 crash, then request 730 is likely unsuitable for replay in a test environment, in which case laboratory cluster 700 may use a different request for regression testing.

Validation of version under test 721 occurs by comparing the results and other operational characteristics of versions 721-722 to each other. For example, the execution durations or other resource consumption (e.g. memory) of versions 721-722 may be compared to detect a performance degradation. Examples of comparable resource consumption include memory footprint, network traffic, disk activity, or processor cycles.

Comparison of results may be subject to a tolerance threshold. For example, a performance degradation of greater than a given duration or percentage may constitute a regression failure.

Versions 721-722 may produce side effects that may be compared. For example, the execution of each version may cause an amount of database records to be created. Side effects may be compared to detect a regression failure.

Although not shown, versions 721-722 may emit an upstream response. The upstream response of each version (and/or downstream calls 741-742) may be compared to each other, perhaps with a threshold to tolerate a discrepancy of a given amount of bytes or a percentage.

In an embodiment, a comparison of upstream responses and/or downstream calls involves a comparison of raw (unparsed) content. In another embodiment, upstream responses and/or downstream calls are parsed and then compared according to semantic analysis. For example, insignificant differences of whitespace or reordering of elements contained within the upstream responses and/or downstream calls may be ignored. In an embodiment, validation involves comparing (whitelist) or not comparing (blacklist) a designated subset of semantic elements.

A whitelist may specify that a particular field of a header or payload should be compared. For example, the Cookie header of an HTTP request or the Status header of an HTTP response may be designated as relevant to regression validation.

A blacklist may specify that a particular field of a header or payload should not be compared. For example, the Date header of an HTTP request or response may be designated as irrelevant to regression validation, perhaps because the Date header is unstable (too variable).

In an embodiment, amounts (and/or downstream service names) of downstream calls made by each version are compared. For example, a downstream service may expose a service interface that has multiple endpoints, and each endpoint has a name.

An endpoint name or downstream service name may be included within the uniform resource locator (URL) of the HTTP request for a downstream call. In an embodiment, a service or endpoint name within an URL to which a downstream call is addressed may be subject to comparison. Alternatively, the entire URL may be compared.

In an embodiment, a crash (aborted execution) is detected as a regression failure. In an embodiment, the size of downstream calls 741-751 and/or the responses of versions 721-722 are compared to each other. For example, the Content-Length header of two HTTP requests or responses may be compared.

Dual Golden Versions

Figure 8:
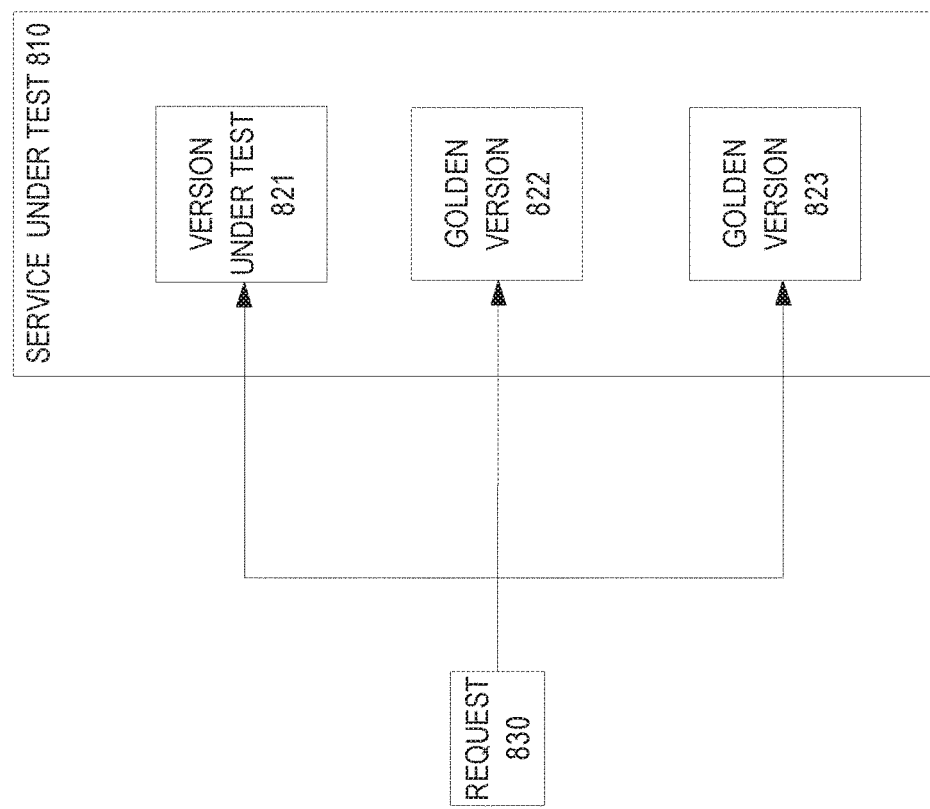
FIG. 8 is a block diagram that depicts an example laboratory cluster that performs regression testing of a software service, in an embodiment.

FIG. 8 is a block diagram that depicts example laboratory cluster 800 that executes one instance of one version and two instances of another version of a same service, in an embodiment. Laboratory cluster 800 may twice replay a request by sending the same request to both instances of the same version and then compare their results.

The degree to which those results match may determine whether or not to execute the version having only one instance, and how much to scrutinize the results of executing that version. Laboratory cluster 800 may be an implementation of computer cluster 100, including mocking of downstream services.

Golden versions 822-823 are duplicate instances of a same approved version. Initially, request 830 may be serially or concurrently replayed to both of golden versions 822-823.

After both of golden versions 822-823 finish processing request 830, laboratory cluster 800 compares their results. Comparison of both golden version results may be subject to a tolerance threshold.

If their results differ by an excessive amount, then recorded request 830 is unstable (not repeatable), and laboratory cluster 800 may select another recorded request. In other words, if a regression test is repeated for many similar requests, then some of those requests may be skipped (discarded) as unstable.

Skipped requests need not be sent to version under test 821. Although downstream calls are not shown, laboratory cluster 800 may also compare downstream calls from golden versions 822-823 when deciding whether to skip a request.

Requests that are not skipped may then be sent to version under test 821. Regression validation involves comparing the results of version under test 821 with the results of at least one of golden versions 822-823.

Furthermore, the comparison of the results of golden versions 822-823 may shape (inform) the comparison of version under test 821 with the results of either of gold version 822-823. For example, a particular header or payload field that does not match between the results of both gold versions 822-823 may be cause to avoid comparing such a field to the same field of the results of version under test 821. However, in this case, request 830 is not skipped. Instead, what is skipped is any comparison of fields that failed to match amongst both golden versions 822-823. For example, an unstable field that naturally varies, such as a timestamp, will not be compared and so will not cause a regression test to fail.

A consequence of dynamically deciding which subset of fields to compare from version under test 821 is that which fields are included within that subset may vary from request to request. For example, if request 830 is only one of many similar requests sent to service under test 810 during an extended regression test, then the subset of fields involved with results comparison may vary between requests. Likewise, comparison of downstream calls may be dynamically limited to a subset of fields.

Dual golden versions may render unnecessary a whitelist or blacklist of fields to compare. As such, dual golden versions may be used to automatically identify which fields to compare.

Likewise, dual golden versions may be used to identify which part of a particular field to compare. For example, the hour of a timestamp field may be stable (comparable), but the seconds of the timestamp may be unstable.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
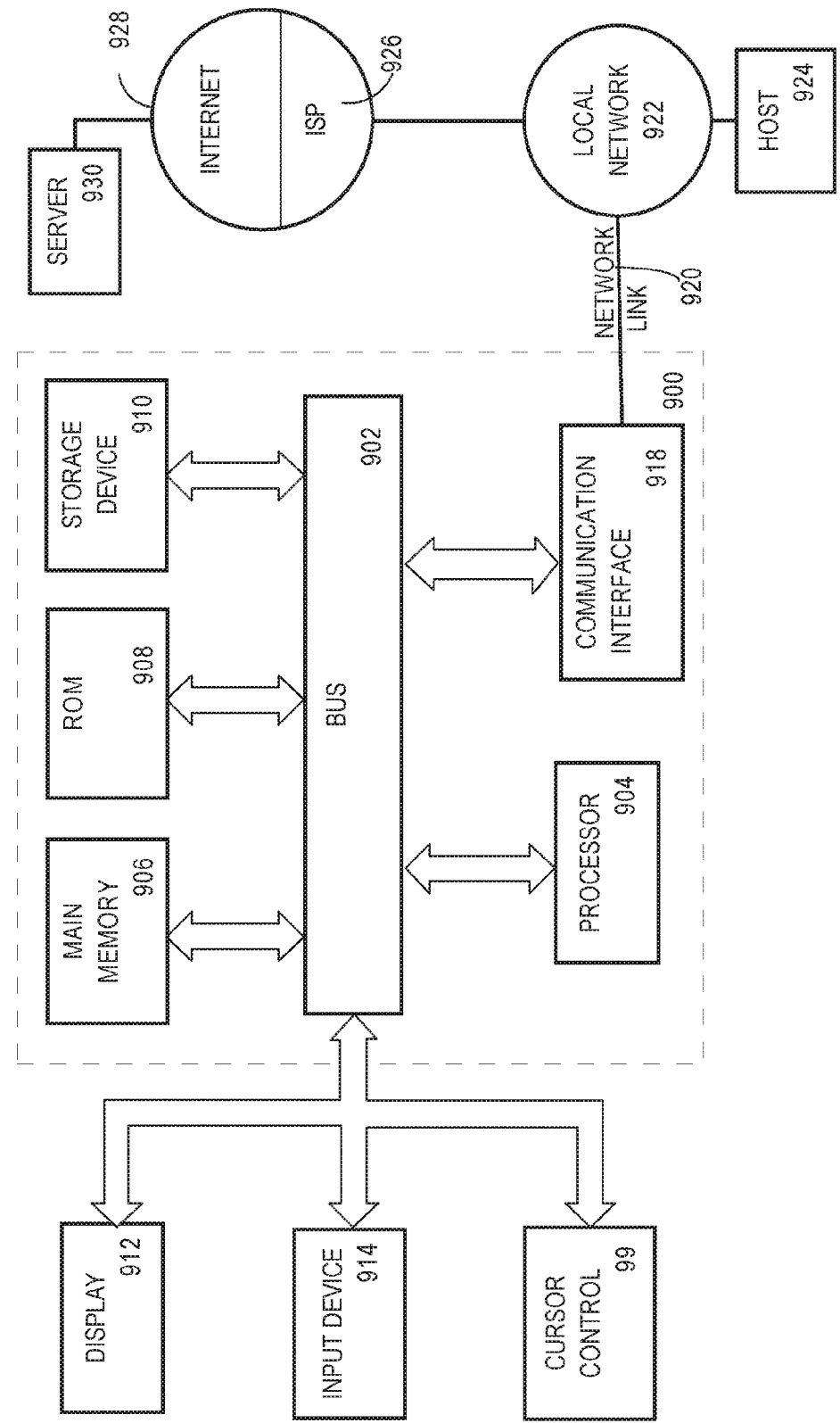
FIG. 9 is a block diagram that illustrates an example computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 99, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922.

For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   for each request of a first plurality of requests, performing:
      while processing, by a first version of a service, said each request of the first plurality of requests performing:
         intercepting one or more first downstream service calls made by the first version of the service; and
         for each downstream service call of the one or more first downstream service calls, providing, to the first version of the service, a first particular response of said each downstream service call of the one or more first downstream service calls that was previously recorded while processing said each request of the first plurality of requests in a production environment;
      wherein processing, by the first version of the service, said each request of the first plurality of requests comprises processing said each request of the first plurality of requests based on the first particular response of at least one of the one or more first downstream service calls;
   processing, by a second version of the service, said each request of the first plurality of requests to generate a second particular response to said each request of the first plurality of requests;
   processing, by the second version of the service, said each request of the first plurality of requests to generate a third particular response to said each request of the first plurality of requests;
   calculating an amount of difference between the third particular response and the second particular response;
   including said each request of the first plurality of requests in a particular set if the amount of difference does not exceed a threshold;
   calculating a statistic based on processing, by the first version of the service, each particular request of the particular set; and
   wherein the method is performed by one or more computing devices.

2. The method of claim 1, further comprising, prior to said providing, to the first version of the service, the first particular response of said each downstream service call of the one or more first downstream service calls, selecting, from among a plurality of responses, the first particular response of said each downstream service call of the one or more first downstream service calls based on at least one of: an identifier of a call tree, an identifier of said each request of the first plurality of requests, or an identifier of said each downstream service call of the one or more first downstream service calls.

3. The method of claim 1, further comprising:
   generating, by the first version of the service, the first particular response to said each request of the first plurality of requests;
   wherein said processing, by the second version of the service, said each request of the first plurality of requests comprises:
      intercepting one or more second downstream service calls made by the second version of the service;
      for each downstream service call of the one or more second downstream service calls, providing, to the second version of the service, a second particular response of said each downstream service call of the one or more second downstream service calls that was previously recorded while processing said each request of the first plurality of requests in the production environment; and
      processing said each request of the first plurality of requests based on the second particular response; and
   comparing the first particular response to the second particular response.

4. The method of claim 3, further comprising:
   measuring a first duration spent processing, by the first version of the service, said each request of the first plurality of requests;
   measuring a second duration spent processing, by the second version of the service, said each request of the first plurality of requests; and
   comparing the first duration to the second duration.

5. The method of claim 4, further comprising:
   calculating a first statistic based on the first duration spent processing, by the first version of the service, each request of the first plurality of requests;

calculating a second statistic based on the second duration spent processing, by the second version of the service, each request of the first plurality of requests;

wherein comparing the first duration to the second duration comprises comparing the first statistic to the second statistic.

6. The method of claim 5, wherein calculating a first statistic comprises calculating at least one of: a geometric mean, a cumulative frequency distribution, a clustering, an unequal variances t-test, or an f-test.

7. The method of claim 5, wherein each request of the first plurality of requests comprises a uniform resource locator (URL) that contains a same endpoint identifier.

8. The method of claim 3, further comprising:
measuring a first amount of a resource consumed by the first version of the service while processing said each request of the first plurality of requests;
measuring a second amount of the resource consumed by the second version of the service while processing said each request of the first plurality of requests; and
comparing the first amount of the resource to the second amount of the resource;
wherein the resource comprises at least one of: memory, network, disk, or processor.

9. The method of claim 3, further comprising:
during said processing, by the second version of the service, said each request of the first plurality of requests, performing:
intercepting one or more third downstream service calls caused by the second version of the service processing said each request of the first plurality of requests; and
for each downstream service call of the one or more third downstream service calls, providing, to the second version of the service, a third particular response of said each downstream service call of the one or more first downstream service calls that was previously recorded while processing said each request of the first plurality of requests in the production environment;
wherein comparing the first particular response to the second particular response is based on comparing the third particular response to the second particular response.

10. The method of claim 1, further comprising recording a particular response of said each downstream service call of the one or more first downstream service calls while processing said each request of the first plurality of requests by a production version of the service in the production environment.

11. The method of claim 10, wherein recording the particular response of said each downstream service call of the one or more first downstream service calls in response to determining that said each request of the first plurality of requests occurs within a sampling of a second plurality of requests.

12. The method of claim 10, wherein:
the one or more first downstream service calls caused by processing by the first version of the service includes a first downstream service call and a second downstream service call;
the first downstream service call causes the second downstream service call;
a header field is contained in both of the first downstream service call and the second downstream service call; and the header field comprises at least one of: an identifier of a same call tree, an identifier of said each request of the first plurality of requests, or a same identifier of one of the one or more first downstream service calls.

13. The method of claim 10, wherein:
recording the particular response of said each downstream service call of the one or more first downstream service calls comprises inserting the particular response of said each downstream service call of the one or more first downstream service calls into a same object graph;
the method further comprises serializing said same object graph.

14. The method of claim 1, wherein providing, to the first version of the service, the first particular response of said each downstream service call of the one or more first downstream service calls comprises providing the first particular response of said each downstream service call of the one or more first downstream service calls after a delay that matches a duration that the downstream service call of the one or more first downstream service calls previously experienced while processing said each request of the first plurality of requests in the production environment.

15. A computer comprising:
a memory configured to store responses by one or more first downstream service calls and a plurality of requests;
a processor, connected to the memory, and the processor configured to perform:
for each request of the plurality of requests, performing:
while processing, by a first version of a service, said each request of the plurality of requests performing:
intercepting the one or more first downstream service calls made by the first version of the service; and
for each downstream service call of the one or more first downstream service calls, providing, to the first version of the service, a first particular response of said each downstream service call of the one or more first downstream service calls that was previously recorded while processing said each request of the plurality of requests in a production environment;
wherein processing, by the first version of the service, said each request of the plurality of requests comprises processing said each request of the plurality of requests based on the first particular response of at least one of the one or more first downstream service calls;
processing, by a second version of the service, said each request of the plurality of requests to generate a second particular response to said each request of the plurality of requests;
processing, by the second verison of the service, said each request of the plurality of requests to generate a third particlar response to said each request of the plurality of requests;
calculating an amount of difference between the third particular response and the second particular response;
including said each request of the plurality of requests in a particular set if the amount of difference does not exceed a threshold; and
calculating a statistic based on processing, by the first version of the service, each particular request of the particular set.

16. One or more non-transitory computer-readable media storing instructions that, when executed by one or more processors, cause:
for each request of a first plurality of requests, performing:

while processing, by a first version of a service, said each request of the first plurality of requests performing:
  intercepting one or more first downstream service calls made by the first version of the service; and
  for each downstream service call of the one or more first downstream service calls, providing, to the first version of the service, a first particular response of said each downstream service call of the one or more first downstream service calls that was previously recorded while processing said each request of the first plurality of requests in a production environment;
wherein processing, by the first version of the service, said each request of the first plurality of requests comprises processing said each request of the first plurality of requests based on the first particular response of at least one of the one or more first downstream service calls;
processing, by a second version of the service, said each request of the first plurality of requests to generate a second particular response to said each request of the first plurality of requests;
processing, by the second version of the service, said each request of the first plurality of requests to generate a third particular response to said each request of the first plurality of requests;
calculating an amount of difference between the third particular response and the second particular response;
including said each request of the first plurality of requests in a particular set if the amount of difference does not exceed a threshold; and
calculating a statistic based on processing, by the first version of the service, each particular request of the particular set.

17. The one or more non-transitory computer-readable media of claim 16, wherein the instructions, when executed by the one or more processors, further cause:
  calculating a first statistic based on a first duration spent processing, by the first version of the service, each request of the first plurality of requests;
  calculating a second statistic based on a second duration spent processing, by the second version of the service, each request of the first plurality of requests;
  wherein comparing the first duration to the second duration comprises comparing the first statistic to the second statistic.

18. The one or more non-transitory computer-readable media of claim 16, wherein the instructions, when executed by the one or more processors, further cause:
  measuring a first amount of a resource consumed by the first version of the service while processing said each request of the first plurality of requests;
  measuring a second amount of the resource consumed by the second version of the service while processing said each request of the first plurality of requests; and
  comparing the first amount of the resource to the second amount of the resource;
  wherein the resource comprises at least one of: memory, network, disk, or processor.

19. The one or more non-transitory computer-readable media of claim 16, wherein the instructions, when executed by the one or more processors, further cause recording the particular response of said each downstream service call of the one or more first downstream service calls in response to determining that said each request of the first plurality of requests occurs within a sampling of a second plurality of requests.

* * * * *